US010006531B2

(12) United States Patent
Yang et al.

(10) Patent No.: US 10,006,531 B2
(45) Date of Patent: Jun. 26, 2018

(54) LOCK-UP CLUTCH AND TORSIONAL VIBRATION DAMPER FOR HYDROKINETIC TORQUE COUPLING DEVICE, AND RELATED METHODS

(71) Applicant: VALEO EMBRAYAGES, Amiens (FR)

(72) Inventors: Zane Yang, Troy, MI (US); Sungchul Lee, Troy, MI (US); Rabah Arhab, Saint-Brice-Sous-Foret (FR); Josip Kovac, Northville, MI (US); Alfonso Medellin, San Luis Potosí (MX)

(73) Assignee: Valeo Embrayages, Amiens (FR)

( * ) Notice: Subject to any disclaimer, the term of this patent is extended or adjusted under 35 U.S.C. 154(b) by 0 days. days.

(21) Appl. No.: 15/247,477

(22) Filed: Aug. 25, 2016

(65) Prior Publication Data

US 2018/0058562 A1 Mar. 1, 2018

(51) Int. Cl.

*F16H 45/02* (2006.01)
*F16D 13/40* (2006.01)
*F16D 25/0635* (2006.01)

(52) U.S. Cl.

CPC ............. *F16H 45/02* (2013.01); *F16D 13/40* (2013.01); *F16D 25/0635* (2013.01); *F16H 2045/0221* (2013.01)

(58) Field of Classification Search

CPC ............. F16H 45/02; F16H 2045/0221; F16H 45/0231; F16H 45/0278; F16D 33/18

See application file for complete search history.

(56) References Cited

U.S. PATENT DOCUMENTS 6,431,335 B1 * 8/2002 Kundermann .......... F16H 45/02 192/3.3
2001/0052443 A1 12/2001 Tomiyama et al.
2007/0056820 A1 3/2007 Degler

FOREIGN PATENT DOCUMENTS

DE 19932576 A1 1/2001
GB 2289315 A 11/1995

* cited by examiner

*Primary Examiner* — Huan Le

(74) *Attorney, Agent, or Firm* — Berenato & White, LLC

(57) ABSTRACT

A hydrokinetic torque coupling device comprises a casing rotatable about a rotation axis, a torque converter including an impeller wheel and a turbine wheel disposed in the casing coaxially with the rotation axis, a locking piston including an annular piston body and a plurality of drive teeth unitary with the piston body, and a torsional vibration damper comprising a input member non-rotatably coupled to the drive teeth of the locking piston, elastic members and an output member elastically coupled to the input member trough the elastic members. The locking piston is axially moveable so as to selectively engage the locking piston against the casing. The input member has window-shaped mating openings complementary to each of the drive teeth. The drive teeth drivingly engage the mating openings of the input member so as to non-rotatably couple the locking piston and the input member.

16 Claims, 8 Drawing Sheets

FIG. 6
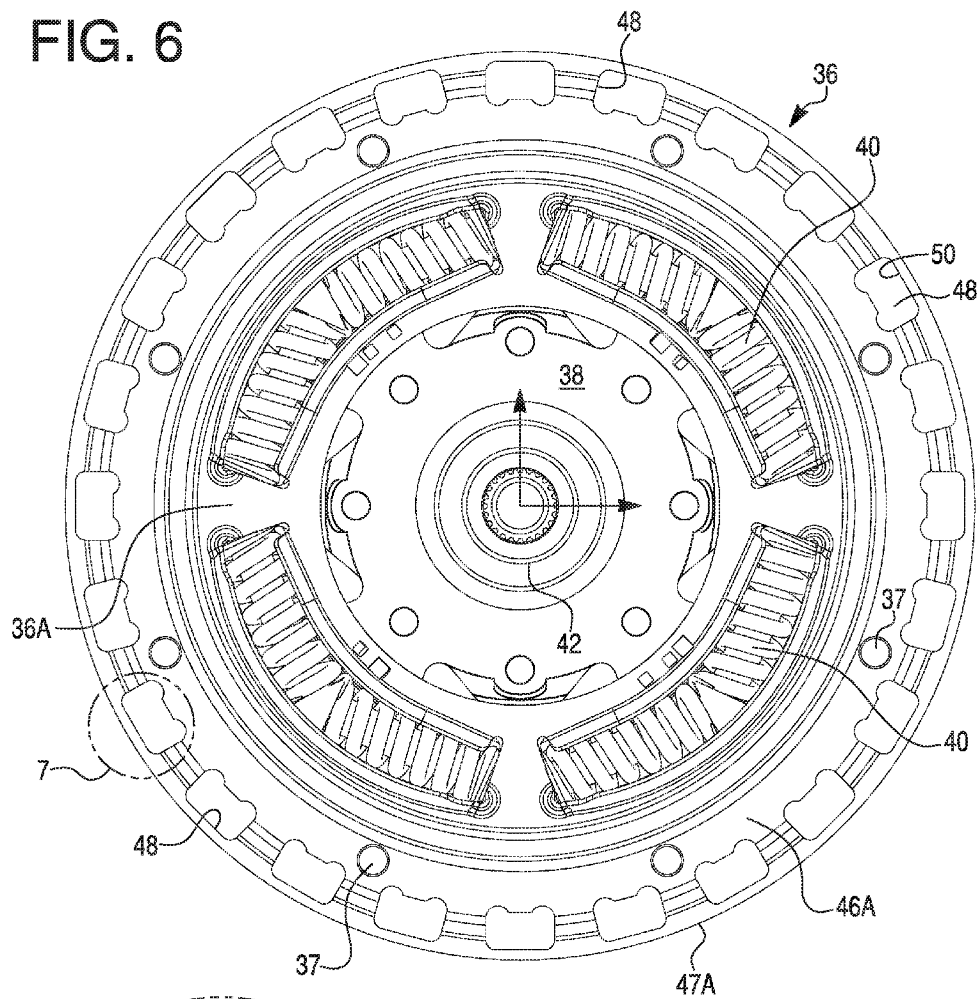
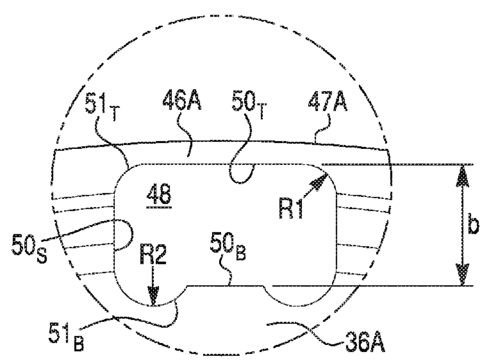
FIG. 7

LOCK-UP CLUTCH AND TORSIONAL VIBRATION DAMPER FOR HYDROKINETIC TORQUE COUPLING DEVICE, AND RELATED METHODS

BACKGROUND OF THE INVENTION

1. Field of the Invention

The present invention generally relates to hydrokinetic torque coupling devices, and more particularly to a hydrokinetic torque coupling device with a lock-up clutch and a torsional vibration damper.

2. Background of the Invention

An internal combustion engine exhibits irregularities due to the succession of combustion events in the engine cylinders. Torsion damping devices allow these irregularities to be filtered before the drive torque is transmitted to an automotive transmission. This is because the vibrations should be damped before they enter the transmission and produce unacceptably troublesome noise. To accomplish damping, it is known to interpose a torsion damping device between a drive shaft and a transmission (or driven) shaft. The torsion damping device is generally arranged in a hydrokinetic torque coupling device that allows temporary but controlled rotational connection of the drive shaft to the transmission shaft.

Typically, a hydrokinetic torque coupling device includes a hydrodynamic torque converter and a torsion damping device positioned between an axially oriented coaxial drive shaft and driven shaft of the automotive transmission. The torsion damping device includes a torque input member and a torque output member, and circumferentially acting elastic members. The circumferentially acting elastic members are interposed between the torque input member and the torque output member. In so-called "long travel" damping devices, the elastic members are mounted, in groups of at least two elastic members, in series between the input element and output element.

While hydrokinetic torque coupling devices and torsion damping devices, including but not limited to that discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque coupling device for coupling together a driving shaft and a driven shaft. The hydrokinetic torque coupling device of the present invention comprises a casing rotatable about a rotation axis, a torque converter including an impeller wheel and a turbine wheel disposed in the casing coaxially with the rotation axis, a locking piston including an annular piston body and a plurality of drive teeth unitary with the piston body, and a torsional vibration damper. The piston body has a front surface axially facing the engagement surface of the casing. The locking piston is axially moveable along the rotation axis to and from the engagement surface of the casing so as to selectively engage the locking piston against the engagement surface of the casing. The torsional vibration damper comprises an input member rotatable about the rotation axis and non-rotatably coupled to the drive teeth of the locking piston, a plurality of circumferentially acting elastic members, and an output member elastically coupled to the input member trough the elastic members. The input member has a plurality of window-shaped mating openings spaced circumferentially equidistantly from one another around the rotation axis. Each of the window-shaped mating openings is complementary to each of the drive teeth of the locking piston. The drive teeth of the locking piston drivingly engage the window-shaped mating openings of the input member so as to non-rotatably couple the locking piston and the input member of the torsional vibration damper.

According to a second aspect of the present invention, there is provided a method for manufacturing a hydrokinetic torque coupling device for coupling together a driving shaft and a driven shaft. The method of the present invention comprises the steps of providing a locking piston including an annular piston body and a plurality of drive teeth unitary with the piston body, and providing a torsional vibration damper comprising an input member, a plurality of circumferentially acting elastic members, and an output member elastically coupled to the input member through the elastic members. The input member is formed with a plurality of window-shaped mating openings spaced circumferentially equidistantly from one another. Each of the window-shaped mating openings is complementary to each of the drive teeth of the locking piston. The method of the present invention further comprises the step of mounting the locking piston to the torsional vibration damper coaxially with the input member so that the drive teeth of the locking piston drivingly engage the mating openings through the input member of the torsional vibration damper.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 6 is a front elevational view of the torsional vibration damper in accordance with the exemplary embodiment of the present invention;

FIG. 7 is an enlarged view of a fragment of the torsional vibration damper shown in the circle "7" of FIG. 6;

Figure 1:
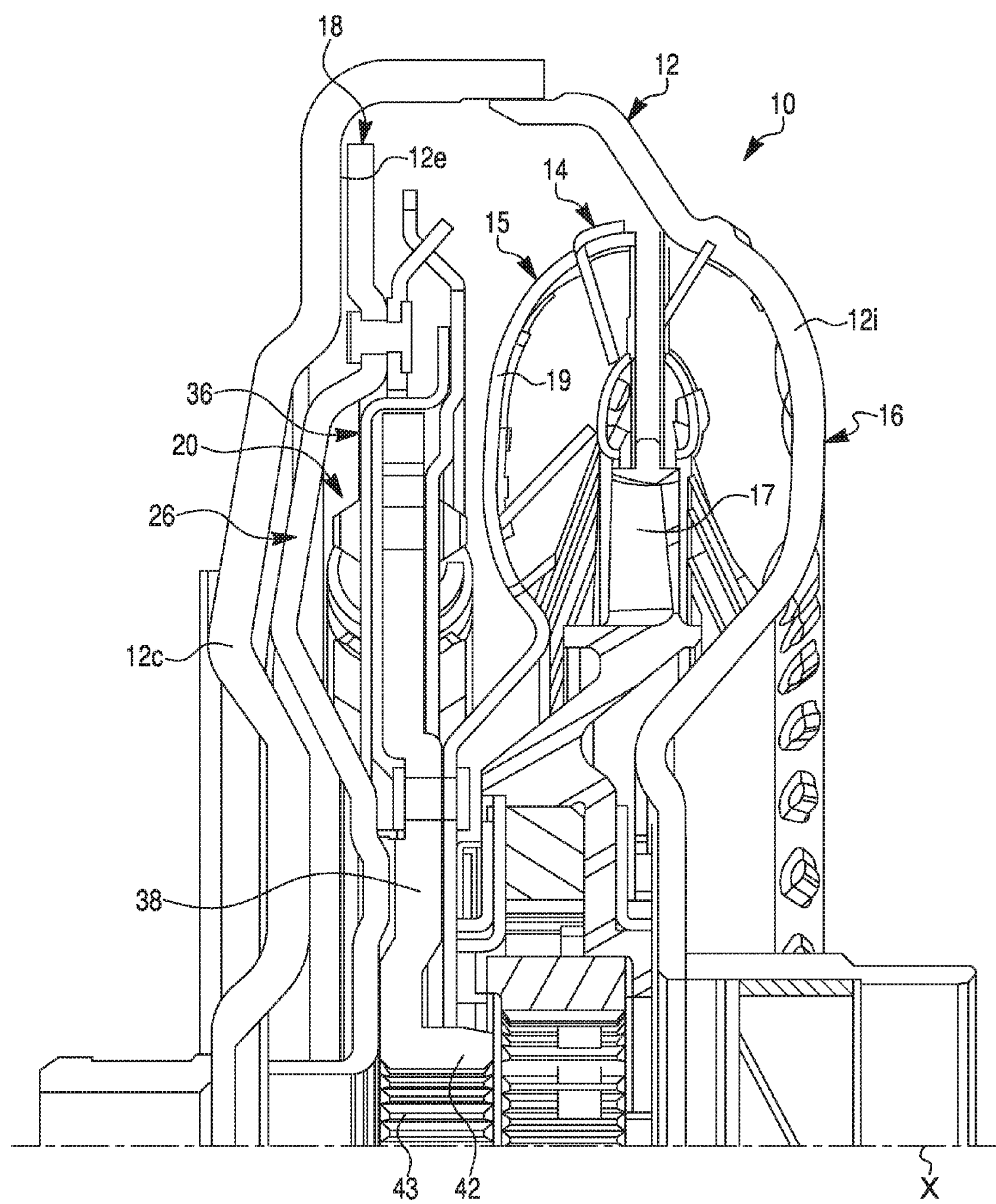
FIG. 1 is a half-view in axial section of a hydrokinetic torque coupling device in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

An exemplary embodiment of a hydrokinetic torque coupling device is generally represented in the accompanying drawings by reference numeral 10, as best shown in a fragmentary sectional view in FIG. 1. The hydrokinetic torque coupling device 1, such as a hydrokinetic torque converter, is intended to couple driving and driven shafts, for example in a motor vehicle. In this case, the driving shaft is an output shaft of an internal combustion engine (not shown) of the motor vehicle and the driven shaft is connected to an automatic transmission of the motor vehicle.

Figure 2:
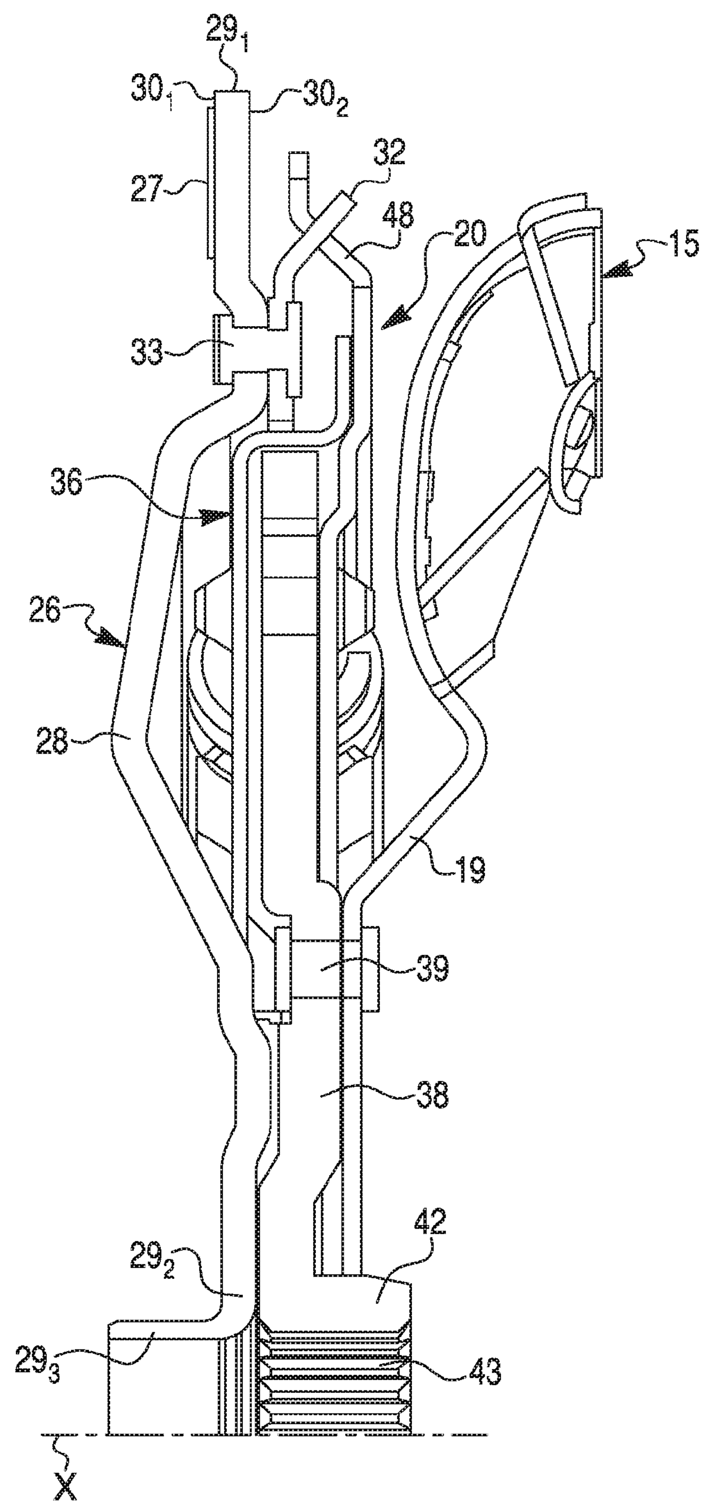
FIG. 2 is a fragmentary cross-sectional half-view of the hydrokinetic torque coupling device in accordance with the exemplary embodiment of the present invention.

The hydrokinetic torque coupling device 10 comprises a sealed casing 12 filled with oil and rotatable about a rotation axis X. The hydrokinetic torque coupling device 10 further comprises a hydrodynamic torque converter 14, a lock-up clutch 18 and a torsional vibration damper (also referred to herein as a damper assembly) 20, all disposed in the sealed casing 12. Hereinafter the axial and radial orientations are considered with respect to the rotation axis X of the torque coupling device 10. The torque converter 14, the lock-up clutch 18 and the torsional vibration damper 20 are all rotatable about the rotation axis X. The torque converter 14 comprises a turbine wheel 15, an impeller wheel 16, and a reactor (or stator) 17 interposed axially between the turbine wheel 15 and the impeller wheel 16. The turbine wheel 15 includes a substantially semi-toroidal turbine shell 19, as best shown in FIG. 2.

The impeller wheel 16 includes a substantially semi-toroidal impeller shell **12*i*, as best shown in FIG. 1. As further shown in FIG. 1, the impeller shell 12*i* and a cover shell 12*c* are non-movably (i.e., fixedly) interconnected sealingly together, such as by welding, at their outer peripheries, so as to define the casing 12. Accordingly, the impeller shell 12*i* sometimes is referred to as part of the casing 12. The cover shell 12*c* is non-movably (i.e., fixedly) connected to the driving shaft, more typically through a flexplate that is non-rotatably fixed to the driving shaft, so that the casing 12 turns at the same speed at which the engine operates for transmitting torque. Each of the cover shell 12*c* and the impeller shell 12*i*** may be made, for example, integrally by press-forming one-piece metal sheets.

The lock-up clutch 18 is provided for locking the driving and driven shafts. The lock-up clutch 18 is generally activated after starting of the motor vehicle and after hydraulic coupling of the driving and driven shafts, in order to avoid the loss of efficiency caused in particular by slip phenomena between the turbine wheel 15 and the impeller wheel 16. Specifically, the lock-up clutch 18 is provided to bypass the impeller wheel 16 and the turbine wheel 15 when in the closed state thereof.

The lock-up clutch 18 includes a locking piston 26 axially displaceable along the rotation axis X toward (an engaged (or lockup) position of the lock-up clutch 18) and away (a disengaged (or non-lockup) position of the lock-up clutch 18) from an engagement surface **12*e* inside the cover shell 12*c* of the casing 12. In other words, the locking piston 26 is provided to be selectively pressed against the engagement surface 12*e* of the casing 12, so as to lock up the torque coupling device 10 between the shafts so to control sliding movement between the turbine wheel 15 and the impeller wheel 16**.

The locking piston 26 includes a substantially annular piston body 28, an annular friction lining 27 fixedly attached to the piston body 28, and a plurality of drive teeth 32 formed unitary with (i.e., non-moveable relative to) the piston body 28. The piston body 28 has two axially opposite surfaces: a first (or front) surface $\mathbf{30}_1$ axially facing the engagement surface **12*e* of the casing 12, and a second (or rear) surface $\mathbf{30}_2$ axially facing the turbine wheel 15 and the torsional vibration damper 20. As best shown in FIG. 2, the annular friction lining 27 is fixedly attached to the first surface $\mathbf{30}_1$ of the piston body 28 at a radially outer peripheral end $\mathbf{29}_1$ thereof by appropriate means known in the art, such as by adhesive bonding, as best shown in FIGS. 1 and 2**.

Figure 3:
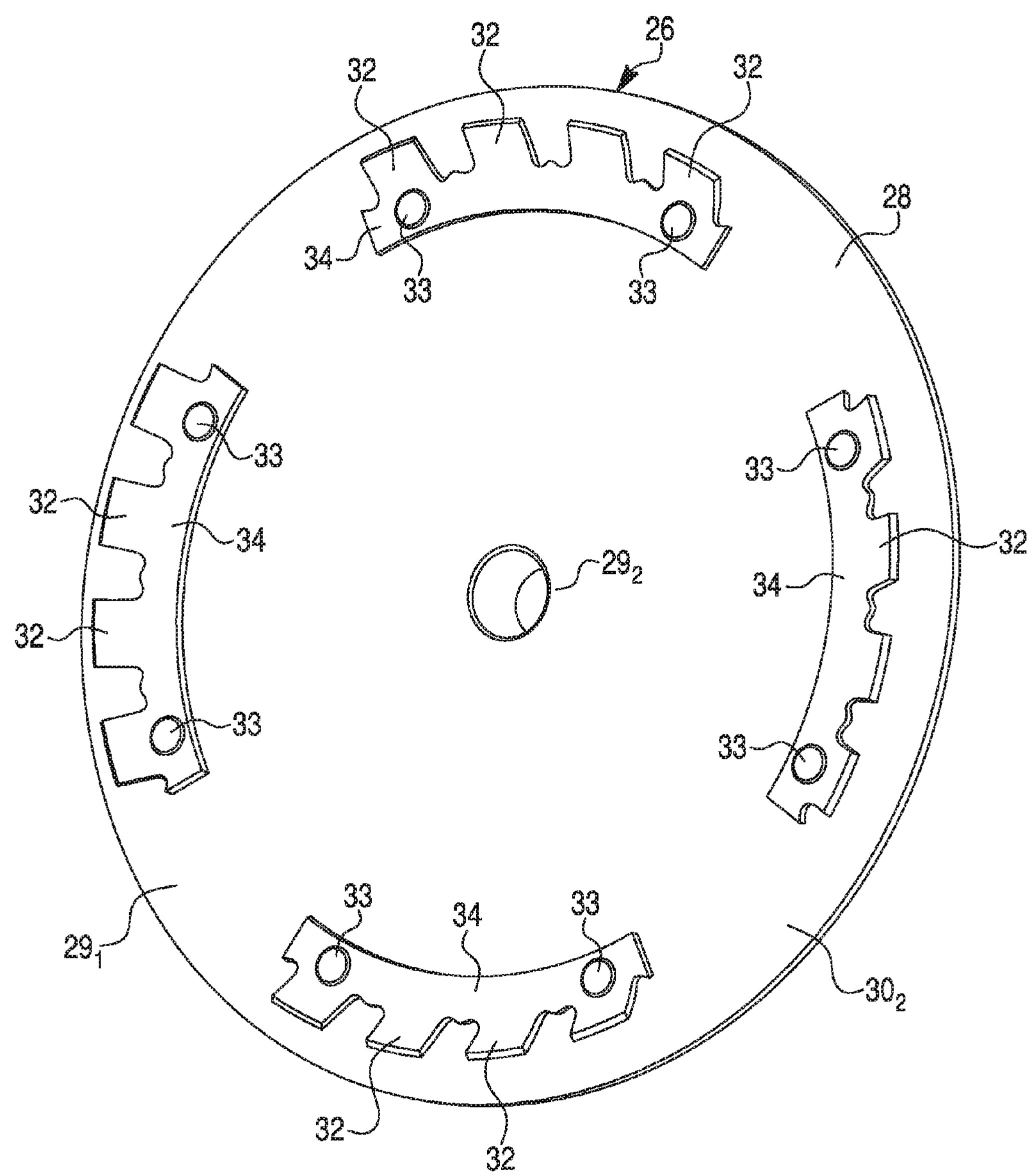
FIG. 3 is a perspective view of a locking piston in accordance with the exemplary embodiment of the present invention.
Figure 4:
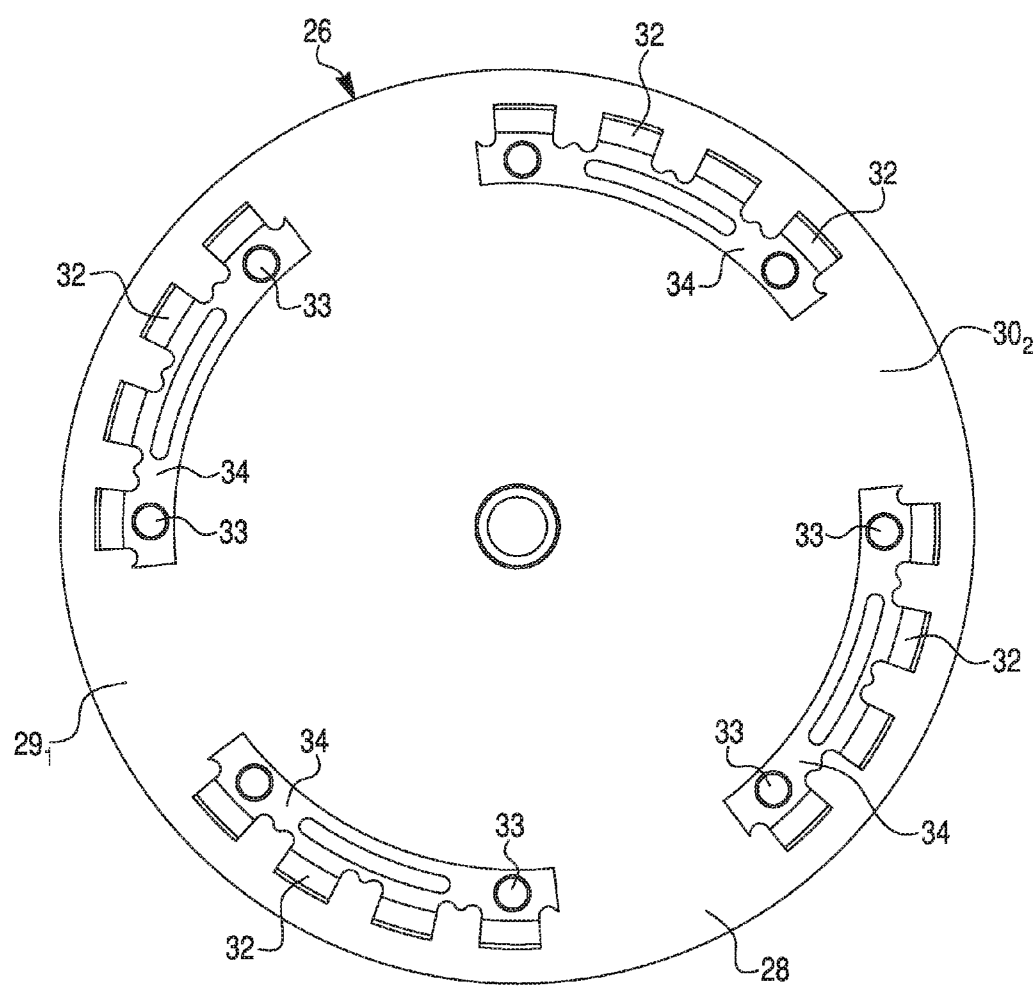
FIG. 4 is a rear view of the locking piston of FIG. 3 in accordance with the exemplary embodiment of the present invention.

As best shown in FIGS. 1-4, the drive teeth 32 extend radially outwardly from the rear surface $\mathbf{30}_2$ of the piston body 28 toward the torsional vibration damper 20. More specifically, as best shown in FIGS. 1-3, each of the drive teeth 32 is oriented obliquely (i.e., inclined) with respect to both the axial (i.e. the rotation axis X) and radial directions. According to the present invention, the locking piston 26 includes one or more drive segments 34, each including one or more of the drive teeth 32. As best shown in FIGS. 3-4, the locking piston 26 according to the exemplary embodiment of the present invention, includes four drive segments 34, each including four drive teeth 32. Each of the drive segments 34 is non-movably (i.e., fixedly) secured to the rear surface $\mathbf{30}_2$ of the piston body 28 by appropriate means, such as rivets 33 or welding. Each of the drive segments 34 with the outwardly extending drive teeth 32 is an integral (or unitary part), preferably made of a single component, but may be separate components fixedly connected together.

The torsional vibration damper 20 advantageously allows the turbine wheel 15 of the torque converter 14 to be coupled, with torque damping, to the input shaft of the automatic transmission. The torsional vibration damper 20 also allows damping of stresses between a first, drive shaft (not shown) and a second, driven shaft (not shown) that are coaxial with the rotation axis X, with torsion damping. The torsional vibration damper 20, as best shown in FIGS. 1-2, is disposed between the turbine shell 19 of the turbine wheel 15 and the locking piston 26 of the lock-up clutch 18. Moreover, the locking piston 26 of the lock-up clutch 18 is elastically coupled to the turbine wheel 15 by the torsional vibration damper 20.

As best shown in FIG. 2, the torsional vibration damper 20 comprises a substantially annular input (or drive) member 36, a substantially annular driven (or output) member 38 rotatably moveable relative to the input member 36, and a plurality of elastic members (or torque transmitting elements) 40, such as coil springs (damper springs)(best shown in FIG. 5), elastically coupling the input member 36 to the output member 38. The output member 38 is non-moveably secured to the turbine shell 19 of the turbine wheel 15 by appropriate means, such as rivets 39 (best shown in FIG. 2).

Figure 8:
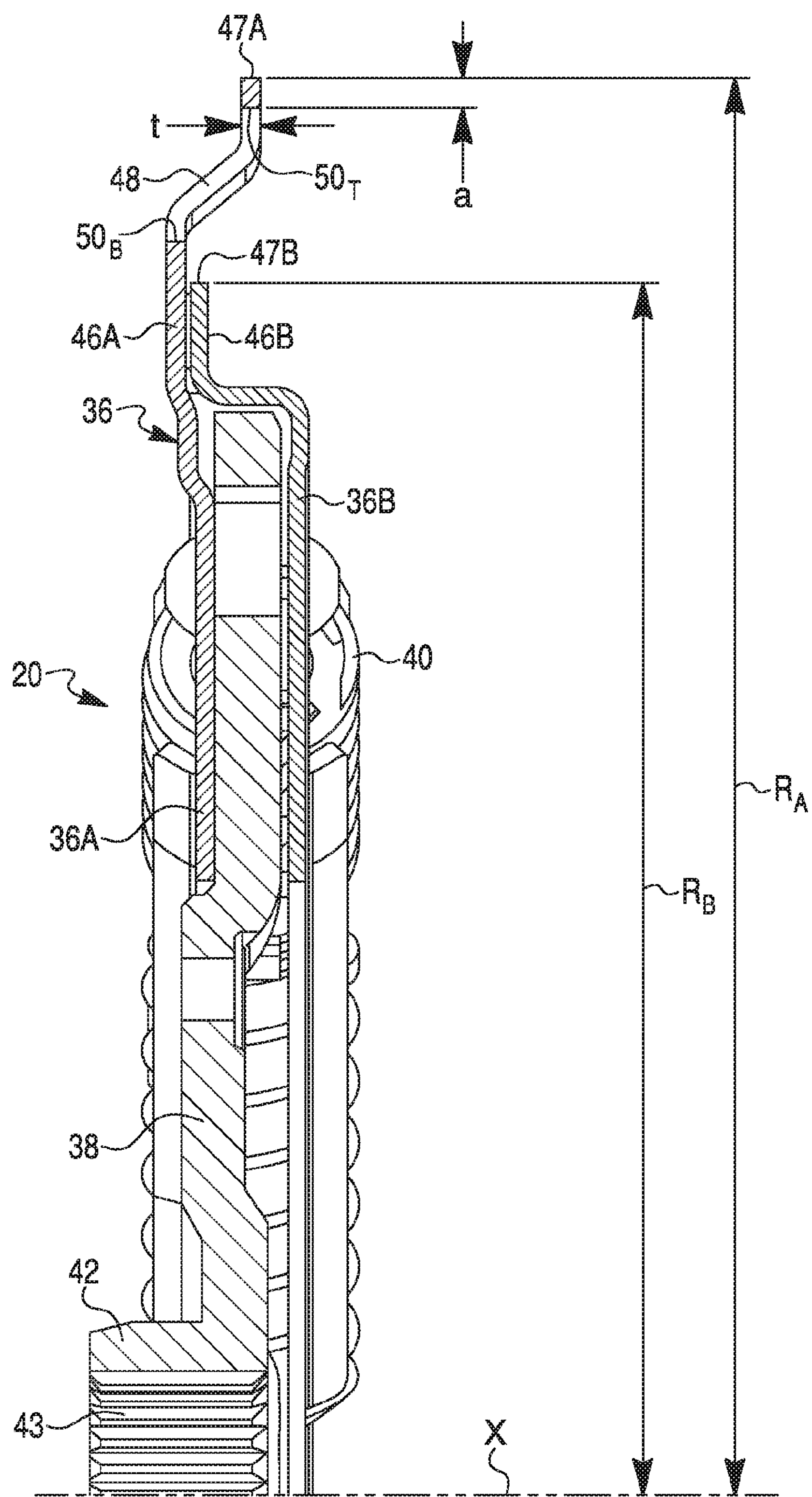
FIG. 8 is a cross-sectional half-view of the torsional vibration damper in accordance with the exemplary embodiment of the present invention.

According to the exemplary embodiment of the present invention, the input member 36 is in the form of first and second substantially annular retainer plates (or guide washers) 36A and 36B, respectively, non-rotatably secured to one another by appropriate means, such as rivets 37 (shown in FIG. 6), as well known in the art. Thus, the first and second retainer plates 36A, 36B are non-rotatable relative to one another, but rotatable relative to the output member 38. Preferably, as best shown in FIG. 8, each of first and second retainer plates 36A and 36B, which may be for example stamped from metal, has a uniform thickness. As best shown in FIGS. 1 and 2, each of the input member 36 (the annular first and second retainer plates 36A and 36B) and the annular output member 38 are coaxial with and rotatable about the rotation axis X.

Further according to the exemplary embodiment of the present invention as best illustrated in FIG. 8, the first retainer plate 36A has a substantially annular radially outer mounting flange 46A. The second retainer plate 36B, on the other hand, has a substantially annular radially outer mounting flange 46B. The first and second retainer plates 36A, 36B are non-movably (i.e., fixedly) secured to one another so that the radially outer mounting flanges 46A, 46B of the first and second retainer plates 36A, 36B engage axially opposite surfaces. Moreover, the first and second retainer plates 36A, 36B are rotatable relative to the output member 38. As further illustrated in FIG. 8, an outer radius $R_A$ of a radially outer edge 47A of the first retainer plate 36A is significantly larger than an outer radius $R_B$ of a radially outer edge 47B of the second retainer plate 36B.

Figure 5:
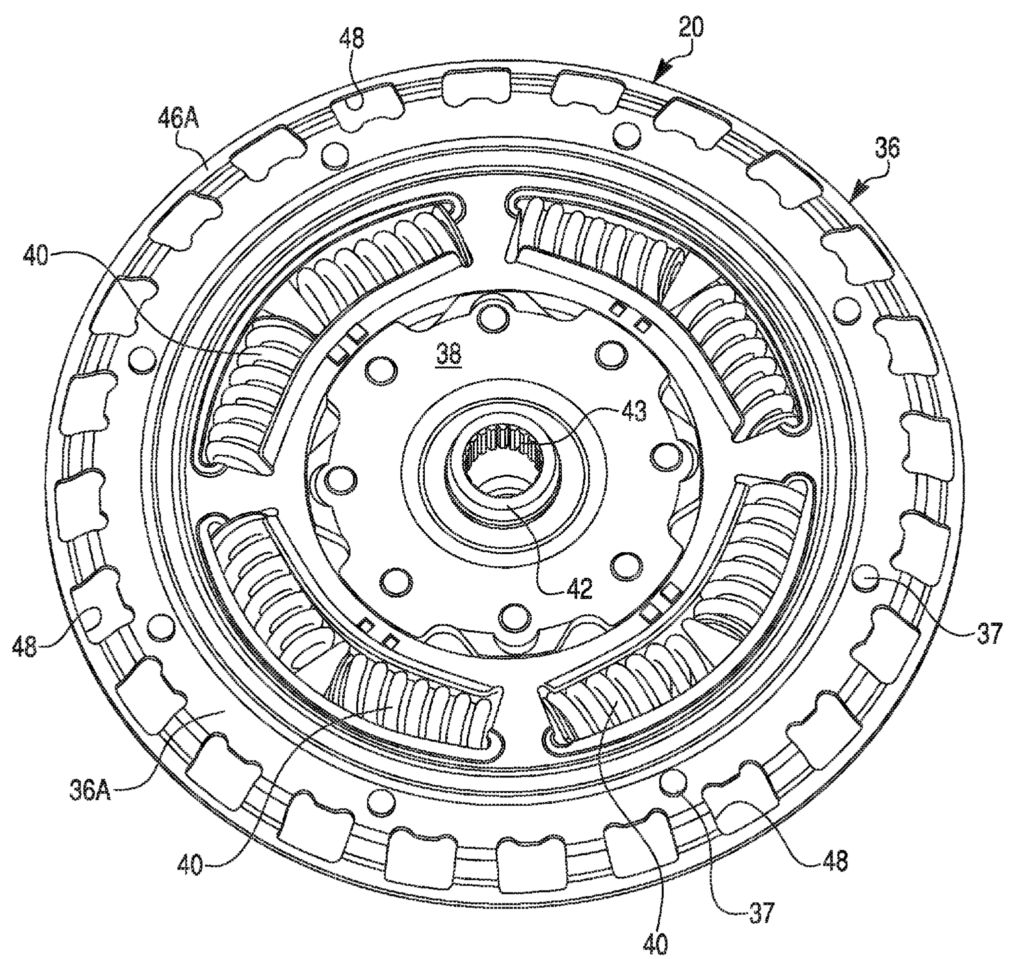
FIG. 5 is a perspective view of a torsional vibration damper in accordance with the exemplary embodiment of the present invention.

As best shown in FIGS. 5, 6 and 8, the radially outer mounting flange 46A of the first retainer plate 36A is provided with a plurality of window-shaped (i.e. having a continuous, uninterrupted inner perimeter) mating openings 48 spaced circumferentially equidistantly from one another around the rotation axis X. The mating openings 48 are arranged radially outside of the radially outer edge 47B of the radially outer mounting flange 46B of the second retainer plate 36B. As best shown in FIGS. 2 and 8, each of the mating openings 48 is oriented obliquely (i.e., inclined) with respect to both the axial and radial directions and extends radially outwardly from the first retainer plate 36A toward the drive teeth 32 of the locking piston 26. Moreover, the mating openings 48 are complementary to the drive teeth 32 of the locking piston 26, so that the drive teeth 32 drivingly engage the mating openings 48 through the outer mounting flange 46A of the first retainer plate 36A. More specifically, each of the mating openings 48 is complementary to each of the drive teeth 32 of the locking piston 26. Accordingly, each of the drive teeth 32 of the locking piston 26 drivingly engages one of the window-shaped mating openings 48 of the first retainer plate 36A with essentially no play in the circumferential direction. As a result, the locking piston 26 is drivingly engaged with the input member 36 of the torsional vibration damper 20.

Figure 9:
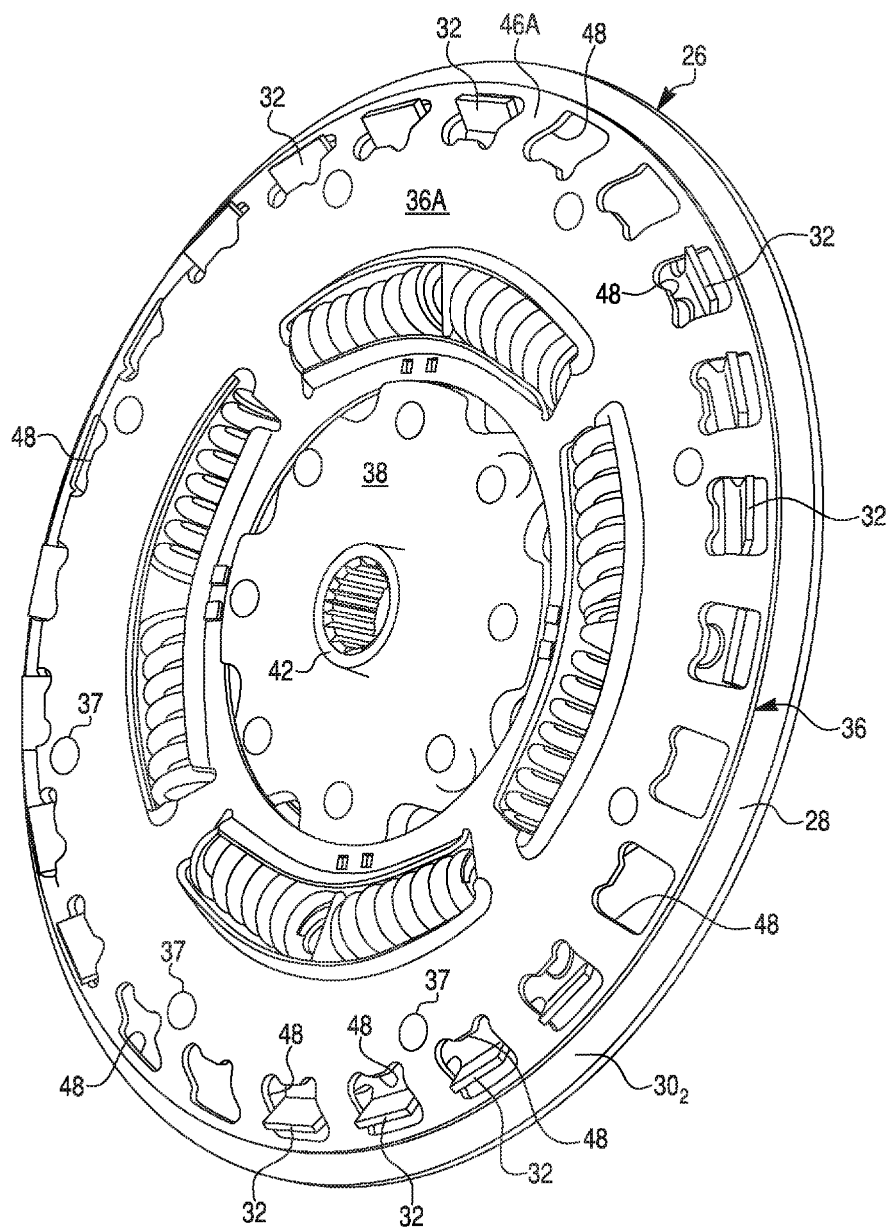
FIG. 9 is a perspective view of the torsional vibration damper drivingly engaged with the locking piston in accordance with the exemplary embodiment of the present invention.

According to the exemplary embodiment of the present invention, the number of drive teeth 32 of the locking piston 26 is less than a number of the window-shaped mating openings 48 of the first retainer plate 36A. Consequently, as illustrated in FIG. 9, each of the drive teeth 32 engages one of the mating openings 48, however not each of the window-shaped mating openings 48 of the first retainer plate 36A is engaged by one of the drive teeth 32 of the locking piston 26. In other words, not all of the mating openings 48 are engaged with the drive teeth 32.

Each of the window-shaped mating openings 48 has a continuous, uninterrupted, generally rectangular inner perimeter 50 defined by radially opposite top and bottom walls $\mathbf{50}_T$ and $\mathbf{50}_B$, respectively, and circumferentially opposite sidewalls $\mathbf{50}_S$, as best shown in FIGS. 6 and 7. Moreover, each of the window-shaped mating openings 48 has a radial height b defined as a distance in the radial direction between the radially opposite top and bottom walls $\mathbf{50}_T$ and $\mathbf{50}_B$ of the mating opening 48. The width of each of the mating openings 48, defined as the distance between the circumferentially opposite sidewalls $\mathbf{50}_S$ of the mating opening 48, is substantially equal to a width of each of the drive teeth 32 of the locking piston 26. According to the exemplary embodiment of the present invention, the radial distance a between the radially outer edge 47A of the first retainer plate 36A and the top wall $\mathbf{50}_T$ of the mating opening 48 is between 1.5 and 4.0 times of a thickness t of the radially outer mounting flange 46A of the first retainer plate 36A. In other words, a=(1.5–4.0)·t.

As further illustrated in FIGS. 6 and 7, in order to prevent stress concentrations, each of the generally rectangular mating openings 48 is rounded at its interior corners so as to define a pair of upper fillets $\mathbf{51}_T$ at radially outer corners of the mating openings 48 (between the top wall $\mathbf{50}_T$ and the sidewalls $\mathbf{50}_S$), and a pair of lower fillets $\mathbf{51}_B$ at radially inner corners thereof (between the bottom wall $\mathbf{50}_B$ and the side walls $\mathbf{50}_S$). According to the exemplary embodiment of the present invention, the fillet radius $R_1$ of each of the upper fillets $\mathbf{51}_T$ is between 0.15 and 0.25 times the radial height b of the mating opening 48, while the fillet radius $R_2$ of each of the lower fillets $\mathbf{51}_B$ is between 0.2 and 0.3 times the radial height b. In other words:

$$R_1=(0.15–0.20)\cdot b;$$

$$R_2=(0.2–0.3)\cdot b.$$

The annular output member 38 of the torsional vibration damper 20 is integrally formed with an output hub 42 arranged to non-rotatably couple together the driven shaft and the turbine wheel 15. The output member 38 with the output hub 42 is preferably an integral part, e.g., made of a single or unitary component, but may be separate components fixedly connected together. The turbine shell 19 of the turbine wheel 15 is non-movably (i.e., fixedly) secured to the output member 38 by any appropriate means, such as by rivets 39 (best shown in FIG. 2) or welding. The output hub 42 has internal splines 43 and is non-rotatably coupled to the driven shaft, such as a transmission input shaft, provided with complementary external splines. The output hub 42 of the output member 38 is rotatable about the rotation axis X and is coaxial with the driven shaft so as to center the turbine wheel 15 on the driven shaft. The first retainer plate 36A with the radially outer mounting flange 46A is preferably an integral part, e.g., made of a single or unitary component, but may be separate components fixedly connected together.

The elastic members 40 are disposed in series relative to each other between the first and second retainer plates 36A and 36B, and between the input member 36 and the output member 38, as best shown in FIGS. 5 and 6. As further illustrated in FIGS. 5 and 6, the elastic members 40 are distributed circumferentially around the rotation axis X. Moreover, the first and second retainer plates 36A and 36B are axially mounted to opposite sides of the input member 36 so as to be oriented parallel to each other and coaxially with the rotation axis X. Moreover, the first and second retainer plates 36A and 36B are arranged axially on either side of the elastic members 40 and are operatively connected therewith. According to the present invention, the elastic members 40 are compressed between the input member 36 and the output member 38 in order to damp sudden changes in torque.

As noted above, the locking piston 26 is axially moveable along the rotation axis X towards and away from the engagement surface 12*e* of the casing 12 so as to selectively position the locking piston 26 against the engagement surface 12*e* of the casing 12. Specifically, when sufficient hydraulic pressure in applied to the locking piston 26, the locking piston 26 moves leftward (as shown in FIG. 1) toward the engagement surface 12*e* of the casing 12, and clamps the friction lining 27 between itself and the engagement surface 12*e* of the casing 12. As a result, the lock-up clutch 18 is in the locked position and is mechanically coupled with the output member 38 so as to bypass the turbine wheel 15 in the locked position of the lock-up clutch 18.

During operation, when the lock-up clutch 18 is in the disengaged (open) position, the engine torque is transmitted by the turbine wheel 15 of the torque converter 14 from the impeller wheel 16 to the turbine hub 10, bypassing the torsional vibration damper 20. However, when the lock-up clutch 18 is in the engaged (locked) position, the engine torque is transmitted by the casing 12 to the turbine hub 10 through the torsional vibration damper 20. When the lock-up clutch 18 is closed, the torque-flow path runs from the casing 12 to the locking piston 26 with the friction lining 27 by means of the frictional engagement thereof. Then, the locking piston 26 transmits torque to the input member 36 by means of the axial non-rotatable connection of the drive teeth 32 of the locking piston 26 with the mating openings 48 of the torque to the input member 36. From the input member 36 the torque flow is smoothed in the torsional vibration damper 20 and is transmitted to the output member 38 (and the output hub 42) by means of the elastic members 40.

The operation of the torsional vibration damper 20 in the locked position is as follows. Abrupt changes in torque are transmitted from the locking piston 26 to the input member 36 of the torsional vibration damper 20, and from the input member 36 to the output member 38 of the torsional vibration damper 20. The elastic members 40, typically coil springs, are compressed between the input member 36 and the output member 38 in order to damp abrupt changes in torque. Specifically, the first and second retainer plates 36A and 36B of the input member 36 load the elastic members 40. Then, the elastic members 40 elastically transmit the torque to the output member 38. More specifically, the input member 36 rotates through a defined angle around rotation axis X with respect to the output member 38, causing simultaneous compression of the elastic members 40. The input member 36 transmits the compressive force from the elastic members 40 to the output member 38. Because of this compression, the input member 36 (i.e., the first and second retainer plates 36A and 36B) rotates through a portion of the defined angle with respect to the output member 38. Subsequently, the torque, dampened by the elastic members 40, is transmitted from the input member 36 to the output member 38.

Described below is an exemplary method of manufacturing of the hydrokinetic torque coupling device 10 according to the exemplary embodiment of the present invention. It should be understood that alternative methods may be practiced within the scope of the invention. This exemplary method is not the exclusive method for assembling the hydrokinetic torque coupling devices described herein. While the method for assembling the hydrokinetic torque coupling device 10 may be practiced by sequentially performing the steps as set forth below, it should be understood that the methods may involve performing the steps in different sequences.

According to an embodied method, the torque converter 14 including the turbine wheel 15, the impeller wheel 16 and the stator 17, the lock-up clutch 18 and the torsional vibration damper 20 may each be preassembled. The locking piston 26 of the lock-up clutch 18 is provided with the drive teeth 32 attached to the rear surface $30_2$ of the piston body 28 by the rivets 33.

The first retainer plate 36A of the torsional vibration damper 20 is formed with the plurality of window-shaped mating openings 48 spaced circumferentially equidistantly from one another around the rotation axis X and complementary to the drive teeth 32 of the locking piston 26. The elastic members 40 are mounted circumferentially to the output member 38 and the radial tabs 34 of the back plate 30. Next, the first and second retainer plates 36A, 36B are mounted on the axially opposite sides of the output member 38 and fixedly attached to one another by the rivets 37 so that the elastic members 40 are disposed axially between the first and second retainer plates 36A, 36B. Then, the output member 38 of the torsional vibration damper 20 is non-moveably secured to the turbine shell 19 of the turbine wheel 15 by the rivets 39. Subsequently, the locking piston 26 is mounted to the torsional vibration damper 20 so that the drive teeth 32 of the locking piston 26 drivingly engage the mating openings 48 of the first retainer plate 36A of the torsional vibration damper 20.

After that, the cover shell 12*c* is sealingly fixed to the impeller shell 12*i* of the casing 12, such as by welding at their outer peripheries, so that the torque converter 14 with the torsional vibration damper 20 and the lock-up clutch 18 are sealed within the casing 12.

Various modifications, changes, and alterations may be practiced with the above-described embodiment.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the hydrokinetic torque coupling device comprising:

a casing rotatable about a rotation axis and having an engagement surface;

a torque converter including an impeller wheel and a turbine wheel disposed in the casing coaxially with the rotation axis;

a locking piston including an annular piston body and a plurality of drive teeth unitary with the piston body, the piston body having a front surface axially facing the engagement surface of the casing and a rear surface axially opposite to the front surface, the locking piston axially moveable along the rotation axis to and from the engagement surface of the casing so as to selectively engage the locking piston against the engagement surface of the casing; and a torsional vibration damper comprising a input member rotatable about the rotation axis and non-rotatably coupled to the drive teeth of the locking piston;

a plurality of circumferentially acting elastic members; and an output member elastically coupled to the input member through the elastic members;

the input member having a plurality of window-shaped mating openings spaced circumferentially from one another around the rotation axis, each of the window-shaped mating openings being complementary to each of the drive teeth of the locking piston;

the drive teeth of the locking piston drivingly engaging the window-shaped mating openings of the input member so as to non-rotatably couple the locking piston and the input member of the torsional vibration damper;

the drive teeth extending radially outwardly from the rear surface of the piston body;

each of the mating openings oriented obliquely with respect to the rotation axis.

2. The hydrokinetic torque coupling device as defined in claim 1, wherein each of the drive teeth is oriented obliquely with respect to the rotation axis so as to extend toward one of the window-shaped mating openings of the input member.

3. The hydrokinetic torque coupling device as defined in claim 1, wherein each of the drive teeth of the locking piston drivingly engages one of the window-shaped mating openings of the input member.

4. The hydrokinetic torque coupling device as defined in claim 1, wherein each of the window-shaped mating openings has a generally rectangular inner perimeter having a radial height.

5. The hydrokinetic torque coupling device as defined in claim 1, wherein the input member includes a first retainer plate coaxial with the rotation axis and elastically coupled to the output member through the elastic members, and wherein the first retainer plate is formed with the window-shaped mating openings engaged by the drive teeth of the locking piston so as to non-rotatably couple the locking piston and the first retainer plate.

6. The hydrokinetic torque coupling device as defined in claim 5, wherein a radial distance between a radially outer edge of the first retainer plate and a top wall of the mating opening is between 1.5 and 4.0 times a thickness of the first retainer plate.

7. The hydrokinetic torque coupling device as defined in claim 5, further comprising a second retainer plate non-moveably secured to the first damper retainer plate coaxially with the rotation axis, wherein the first retainer plate and the second retainer plate are mounted adjacent to axially opposite surfaces of the output member, and wherein the second retainer plate is elastically coupled to the output member through the elastic members.

8. The hydrokinetic torque coupling device as defined in claim 1, wherein the elastic members are disposed in series relative to each other.

9. The hydrokinetic torque coupling device as defined in claim 1, wherein the turbine wheel is non-rotatably connected to the output member of the torsional vibration damper.

10. The hydrokinetic torque coupling device as defined in claim 1, wherein the locking piston further includes an annular friction lining fixedly attached to the front surface of the piston body.

11. A hydrokinetic torque coupling device for coupling together a driving shaft and a driven shaft, the hydrokinetic torque coupling device comprises:

a casing rotatable about a rotation axis and having an engagement surface;

a torque converter including an impeller wheel and a turbine wheel disposed in the casing coaxially with the rotation axis;

a locking piston including an annular piston body and a plurality of drive teeth unitary with the piston body, the piston body having a front surface axially facing the engagement surface of the casing, the locking piston axially moveable along the rotation axis to and from the engagement surface of the casing so as to selectively engage the locking piston against the engagement surface of the casing; and a torsional vibration damper comprising a input member rotatable about the rotation axis and non-rotatably coupled to the drive teeth of the locking piston;

a plurality of circumferentially acting elastic members; and an output member elastically coupled to the input member through the elastic members;

the input member having a plurality of window-shaped mating openings spaced circumferentially from one another around the rotation axis, each of the window-shaped mating openings being complementary to each of the drive teeth of the locking piston;

the drive teeth of the locking piston drivingly engaging the window-shaped mating openings of the input member so as to non-rotatably couple the locking piston and the input member of the torsional vibration damper;

each of the window-shaped mating openings having a generally rectangular inner perimeter having a radial height;

each of the window-shaped mating openings being rounded at interior corners thereof so as to define a pair of upper fillets at radially outer corners of the mating openings and a pair of lower fillets at radially inner corners thereof.

12. The hydrokinetic torque coupling device as defined in claim 11, wherein a fillet radius of each of the upper fillets is between 0.15 and 0.25 times the radial height of the mating opening, and wherein a fillet radius of each of the lower fillets is between 0.2 and 0.3 times the radial height of the mating opening.

13. A method for manufacturing a hydrokinetic torque coupling device for coupling together a driving shaft and a driven shaft, the method comprising the steps of:

providing a locking piston including an annular piston body and a plurality of drive teeth unitary with the piston body;

providing a torsional vibration damper comprising a input member;

a plurality of circumferentially acting elastic members; and an output member elastically coupled to the input member through the elastic members;

the input member is formed with a plurality of window-shaped mating openings spaced circumferentially equidistantly from one another, each of the window-shaped mating openings being complementary to each of the drive teeth of the locking piston; and mounting the locking piston to the torsional vibration damper coaxially with the input member so that the drive teeth of the locking piston drivingly engage the mating openings through the input member of the torsional vibration damper;

each of the window-shaped mating openings having a generally rectangular inner perimeter having a radial height;

each of the window-shaped mating openings being rounded at interior corners thereof so as to define a pair of upper fillets at radially outer corners of the mating openings and a pair of lower fillets at radially inner corners thereof.

14. The method as defined in claim 13, further comprising the steps of:

providing a torque converter comprising an impeller wheel comprising an impeller shell; and a turbine wheel coaxially aligned with and hydrodynamically drivable by the impeller wheel, the turbine wheel comprising a turbine shell; and non-moveably securing the output member of the torsional vibration damper to the turbine shell of the turbine wheel.

15. The method as defined in claim 14, further comprising the step of non-rotatably securing a casing shell to the impeller shell of the torque converter to form a casing housing the locking piston and the torsional vibration damper.

16. The method as defined in claim 13, wherein a fillet radius of each of the upper fillets is between 0.15 and 0.25 times the radial height of the mating opening, and wherein a fillet radius of each of the lower fillets is between 0.2 and 0.3 times the radial height of the mating opening.

* * * * *